Patented Aug. 31, 1943

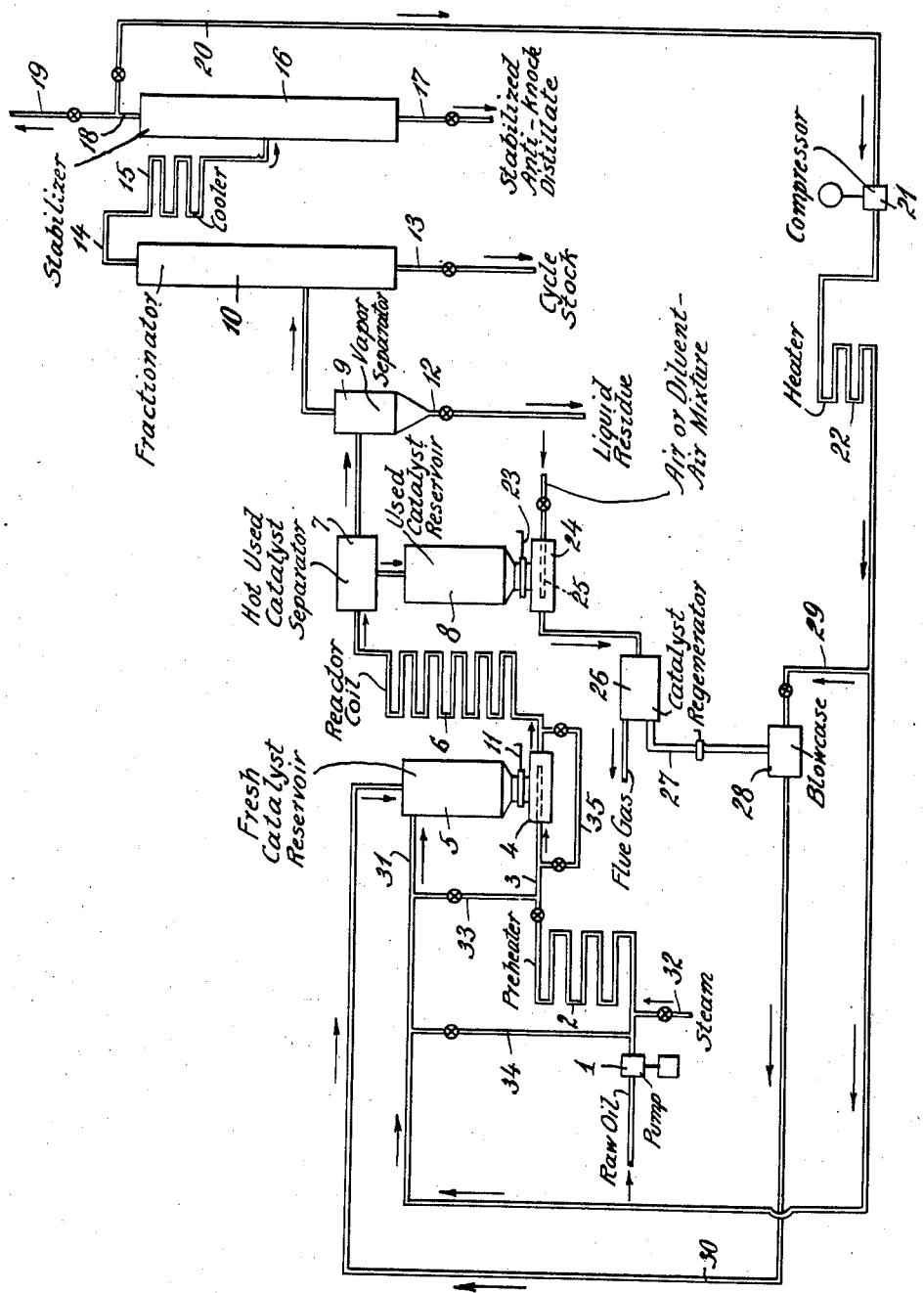

2,328,178

UNITED STATES PATENT OFFICE 2,328,178

MANUFACTURE OF GASOLINE

John W. Teter, Chicago, Ill., assignor to Sinclair Refining Company, New York, N. Y., a corporation of Maine Application August 7, 1941, Serial No. 405,752

3 Claims. (Cl. 196—52)

My present invention relates to improvements in the production of motor fuel gasoline of high anti-knock value by conversion of higher boiling hydrocarbons, or hydrocarbons of the same general boiling range but of lower anti-knock value, induced by contact with a catalyst of the adsorptive type at elevated temperature. The general objects of my invention include, in processes for such production of motor fuel gasoline, improvements in efficiency and economy, improvements in yield and particularly in reduced production of normally gaseous hydrocarbons, and improvements in the anti-knock value of the motor fuel product. The process of my invention has the further advantage that it makes efficient and effective use of the less costly adsorptive catalysts of low or moderate directive activity.

Cracking processes employing adsorptive catalysts may be grouped in two general classes. The first general class includes processes in which the oil to be converted is vaporized and the oil vapors are passed through a fixed bed of the catalyst in pelleted form. The second general class includes processes wherein the catalyst in a finely-divided state is admixed with the oil to be converted, in liquid or vapor phase, and this mixture is then passed through a cracking zone in which the desired conditions of temperature and pressure are maintained, the rate of flow being adequate to maintain uniform dispersion of the catalyst through the oil, or oil vapors, throughout the cracking zone. Processes of the latter type have been developed in which the cracking zone comprises an elongated conduit of restricted cross section, for example a heating coil, and this form of process has the advantage that it permits utilization of much of the available cracking equipment originally designed for thermal cracking processes, with minor modifications and additions.

Processes of the latter type in which the concentration of dispersed catalyst in oil in the cracking zone varies from somewhat less than 1% to 2% or somewhat higher have been found effective when employing catalysts of high directive activity such as crystalline aluminum fluoride and synthetic silica-alumina compositions. Such catalysts increase the rate and extent of conversion and substantially reduce the formation of normally gaseous hydrocarbons. Moreover, their directive activity is so great that they effect production of gasoline having an anti-knock value approaching the maximum attainable by the action of such catalysts even when the time during which the hydrocarbon vapors are in contact with the catalysts at the desired cracking temperature is very short, less than 15 seconds for example. Furthermore their effectiveness in this respect continues when the time factor is prolonged and the temperature is increased to effect conversion of a substantial proportion of the oil vapors into hydrocarbons suitable as components of the desired high anti-knock motor fuel gasoline. However, the cost of this type of catalyst is so high that even with the benefit of repeated reactivations, operations employing upwards of about 2% of such catalysts are not economically feasible.

On the other hand attempts to utilize in this type of process catalysts of low or moderate directive activity, for example naturally occurring clays and naturally occurring clays that have been subjected to acid treatment to improve their catalytic activity, have been severely handicapped by the relatively small volume of the cracking zone as compared to processes of the fixed bed type as well as by the reduced directive activity of the catalyst itself. Economic considerations necessitate conversion of a substantial proportion of the oil into hydrocarbons suitable as components of the desired high anti-knock motor fuel in a single passage through the cracking zone so as to avoid the excessive heating burden of a high recycle ratio. Catalysts of moderate or low directive activity, in the low concentrations heretofore used in operations of this type, increase the rate of cracking and retard the formation of normally gaseous hydrocarbons when the conversion per pass is severely limited. Furthermore, like the catalysts of high directive activity, they are effective, in processes of this type, in eliminating or substantially reducing the formation of carbonaceous deposits on the inner surfaces of the heating and cracking zone. However, even in such operations the anti-knock value of the gasoline produced, although sometimes higher than that produced by thermal cracking under similar conditions, is markedly inferior to the anti-knock properties attainable in similar operations with catalysts of high directive activity. Increasing the concentration of catalyst to 5% fails to produce a significant increase in the anti-knock value of the gasoline produced. Moreover, attempts to increase the extent of conversion effected in a single passage through the cracking zone, by increasing the temperature to increase the rate of conversion or by increasing the pressure to increase the time factor, have been found alternatively to increase abnormally the production of normally gaseous hydrocarbons or to reduce even further the anti-knock value of the resultant gasoline, probably due to the extent to which cracking effected thermally is thereby increased with respect to the extent of cracking effected catalytically.

I now have found that when finely-divided adsorptive catalysts of moderate or low directive activity are dispersed through the vaporized oil in high concentrations, for example 10%-50% by weight on the vaporized oil, the severity and depth of a cracking treatment may be increased, by increasing both the temperature and the pressure to which the mixture is subjected in the cracking zone, with improvement rather than impairment in the anti-knock value of the gasoline produced provided the period of contact between the hydrocarbon vapors and catalyst under conversion conditions exceeds a minimum period. Moreover, under proper conditions this improvement in anti-knock value is accompanied by an increase in the gasoline production and by a substantial retention of the reduction in the formation of normally gaseous hydrocarbons which is characteristic of catalytic cracking reactions. This minimum period with most oils appears to be about 23 seconds if the resultant gasoline is to have an anti-knock value approaching the maximum attainable by catalytic cracking with catalysts of high directive activity.

I have found that the use of temperatures considerably higher than those normally employed in most catalytic operations may be used with advantage in operations wherein a catalyst of low or moderate activity is dispersed through the oil vapors in high concentrations and that an increase in temperature, at least with temperatures up to 1050-1075° F., accelerates the rate of catalytic cracking more rapidly than the rate of thermal cracking thereby increasing the anti-knock value of the produced gasoline. Within limits, a high concentration of the dispersed catalyst suppresses the excessive production of gas normally incident to the use of very high temperatures in thermal cracking operations. The optimum temperature varies somewhat with the catalyst employed and appears to be about 50° F. higher for catalysts of low directive activity than for catalysts of moderate directive activity. However, at temperatures substantially exceeding 1075° F., the gas production becomes excessive notwithstanding the suppressing action of the catalyst in high concentration.

I have also found that with these high ratios of catalyst to oil-vapors in the cracking zone, an increased pressure may be employed to increase the time factor well beyond the minimum period required to obtain an anti-knock value approaching the maximum, thereby further increasing the extent to which conversion is effected in a single passage through the cracking zone, without serious impairment, and with a slight improvement in some instances, of the anti-knock properties of the resulting gasoline. However, even with the dispersed finely-divided catalyst present in high concentration, I have found that prolongation of the time factor effected either by an increase in pressure or by an increase in the volume of the cracking zone cannot be extended indefinitely without reaching a point at which the production of high anti-knock gasoline reaches a maximum value, further extension of the time factor having the effect of decreasing both gasoline production and octane value and of abnormally increasing the production of gas and carbon. The maximum desirable time factor varies to some extent with the particular catalyst employed, with the concentration of the catalyst, and with the temperature. In general with a catalyst of moderate activity, the time factor should not exceed the minimum period required to convert about 52% of the charge by volume into the desired high anti-knock gasoline in a single passage through the cracking zone, whereas with catalysts of low directive activity the corresponding conversion is somewhat less although the time required to attain it may be somewhat greater. With a reaction temperature of 1050° F. and with a catalyst of moderate activity present in a concentration approximating 50% by weight on the oil-vapors, the apparent time factor at the reacting temperature should not exceed about 125 seconds.

In my improved process oil to be cracked, in vapor form, admixed with a finely-divided catalyst of low or moderate directive activity in high concentration is passed through an elongated cracking zone of restricted cross section at a velocity adequate to maintain a uniform dispersion of the catalyst through the oil vapors. This mixture is maintained in the cracking zone at a temperature upwards of about 1000° F., preferably upwards of 1000° F. and not substantially exceeding 1075° F., for a period of time sufficient to convert a substantial proportion of the oil, for example 28-52% by volume, into the desired high anti-knock gasoline. The period of contact at the selected cracking condition must be upwards of about 23 seconds in any event. The mixture in the cracking zone is subjected to a pressure upwards of about 30 pounds per square inch. It now appears that pressures ranging from about 75 pounds to 200 pounds per square inch are particularly desirable and that pressures substantially exceeding 400 pounds per square inch should usually be avoided. Increasing the pressure above 200 pounds tends to suppress the formation of gas as well as to increase the capacity of a given apparatus. However, the higher pressures also increase carbon formation. Moreover, excessive pressures tend materially to increase the density of the mixture of catalyst and oil-vapors, and thus the difficulty of maintaining uniform dispersion when the catalyst is present in high concentrations. The ratio of catalyst to oil-vapors in the cracking zone should be maintained upwards of about 1:10 on the weight basis and usually should not exceed about 5:10. If the catalyst is to be regenerated and cyclically re-used, it is preferable to employ catalyst to oil ratios between 3:10 and 5:10. If the catalyst is one of low directive activity which is to be used once and then discarded, the most desirable ratio of catalyst to oil does not substantially exceed 1:10, as the increased advantages attainable by increasing this ratio, to 3:10 for example, are not commensurate with the accompanying increase in catalyst cost. Under certain conditions the ratio of catalyst to oil-vapors in the cracking zone may with advantage exceed 5:10 particularly if the pressure is less than 75 pounds per square inch. However, in view of the importance of maintaining uniform dispersion of the catalyst in the oil-vapors during passage through the cracking zone and the difficulty of maintaining uniform dispersion when using pressures high enough to make effective use of cracking coils typical of thermal cracking processes, it usually is undesirable for this ratio substantially to exceed 5:10 for practical considerations. The maintenance of a uniform dispersion of the catalyst through the oil is necessary in order to obtain the high conversion per pound of catalyst which is characteristic of processes of this general type as compared to catalytic cracking processes of the chamber type.

With catalysts of low activity the optimum catalyst concentration appears to be somewhat lower than with catalysts of moderate activity.

On the other hand the optimum temperature for efficient production of high anti-knock gasoline appears to be somewhat higher with catalysts of low activity than with catalysts of moderate activity. Likewise, the optimum temperature appears to be slightly higher with naphthenic oils than with oils that are predominantly paraffinic.

Naturally occurring adsorptive clays such as fuller's earth are examples of catalysts of low directive activity useful in the process of my invention. Naturally occurring clays which have been acid treated to increase their directive activity, such as the products now generally marketed under the trade names of "Super Filtrol" and "Actolite," are examples of catalysts of moderate directive activity which are useful in the process of my invention. The catalysts should be supplied in a very finely-divided state, preferably 200–400 mesh, or finer. The catalysts may be pre-mixed with the oil in liquid state prior to vaporization of the oil, or introduction of the catalyst may be delayed until the oil has been vaporized and brought approximately to the conditions desired to be maintained in the cracking zone. In either event, it is desirable to heat the oil rapidly to the high temperature at which it is desired to carry out the catalytic conversion in order to minimize cracking effected thermally. When a naturally occurring adsorptive earth is used as the catalyst and the earth is pre-mixed with the oil, it has been found that it is not necessary initially to eliminate uncombined moisture contained in the earth. The presence of a small proportion of steam appears to have a favorable effect on the action of the catalyst.

The accompanying drawing illustrates in a conventional and diagrammatic manner one arrangement of apparatus adapted to carry out the process of my invention. In the operation of the arrangement illustrated, raw oil to be cracked may be supplied by pump 1 to a preheater 2 in which the oil is vaporized and heated approximately to the temperature desired to be maintained in the cracking zone. The hot oil vapors then pass via line 3 to mixer 4, to which fresh or reactivated finely-divided catalyst may also be supplied from active catalyst reservoir 5 at a rate controlled by slide valve 11. The mixture of oil-vapors and catalyst then passes through reactor coil 6, which constitutes the cracking zone, to the hot used catalyst separator 7. This separator may comprise, for example, one or a series of cyclone separators from which used catalyst is conveyed by gravity to used catalyst reservoir 8. The hydrocarbon products from separator 7, relatively free from spent catalyst, then pass in succession through a separator 9 and a fractionator 10. In separator 9 hydrocarbons too heavy for use as components of a cycle stock are separated and discharged as a liquid residue at 12. Those hydrocarbons having a boiling point higher than the gasoline boiling range are condensed in fractionator 10 and the condensate is discharged through 13. This condensate may be recycled to the heating zone 2, supplied as a charging stock to a thermal cracking unit, or otherwise disposed of. The gas vapor mixture which leaves fractionator 10 through line 14 passes through cooler 15 and thence to stabilizer 16. The stabilized high anti-knock gasoline product is drawn off through line 17 and normally gaseous hydrocarbons are discharged from the stabilizer through line 18. In the arrangement shown a portion of the gaseous product may be vented through line 19 and another portion recirculated through line 20, compressor 21, and heater 22 to the reactor coil 6 via line 33, or alternatively to the inlet of preheater 2, via line 34. Recirculation of a portion of the normally gaseous hydrocarbon reaction products, either in the manner illustrated or by absorption in a portion of the charging oil, effects a marked reduction in the proportion of gases formed and promotes the formation of hydrocarbons suitable as components of the desired high anti-knock gasoline product. In the apparatus conventionally illustrated in the drawing, provision is made for supplying used catalyst from reservoir 8, at a rate controlled by slide-valve 23, to feed chamber 24, from which in admixture with air or air together with an inert diluent such as flue gas, supplied to jet 25, the used catalyst is conveyed to a catalyst regenerator illustrated diagrammatically at 26. Regeneration may be carried out by controlled oxidation of the carbon deposited on the used catalyst. From 26 the regenerated catalyst is conveyed via line 27 to blow-case 28. In the illustrated arrangement a portion of the hot gas from heater 22 may be by-passed through line 29 and utilized to force the regenerated catalyst from blow case 28 through line 30 to catalyst reservoir 5. Another portion of the gas from heater 22 may be by-passed directly to catalyst reservoir 5 through line 31 to maintain a balancing pressure in 5. The illustrated apparatus also provides means for supplying a limited quantity of steam to the inlet of preheater 2 via line 32. When supplied to the preheater 2 a small amount of steam promotes vaporization of the liquid oil in 2 and, when present in amounts approximating 2% on the oil, steam also appears to have a desirable effect on the action of the catalyst in the reactor coil 6.

The process of my invention is not limited however to the use of any particular procedure in effecting regeneration of the used catalyst. Indeed it may be practiced to advantage without regeneration of the used catalyst, particularly when employing a catalyst of low cost as well as low directive activity. Moreover, the catalyst may be pre-mixed with the oil supplied to preheater 2 and the resulting vapor-catalyst mixture discharged from preheater 2 by-passed directly to reactor coil 6 through by-pass 35.

A further description of specific operations employing specific stocks and specific catalysts in low and high concentrations and with specific temperatures and pressures will further illustrate the advantages of the process of my invention. In the exemplary operations hereinafter described all results are given on the basis of once-through operations and with no recirculation of condensate from fractionator 10 or of gas from stabilizer 16 and with no recirculation of used and regenerated catalysts, in order to eliminate as many variables as possible and afford a more direct basis for comparison. In each of the operations hereinafter described the charging stock was a gas oil fraction having a gravity of approximately 38° A. P. I. derived from a Pennsylvania type crude. The gas oil fraction had approximately the following boiling characteristics:

| | °F. |
|---|---|
| I. B. P. | 470 |
| 10% | 545 |
| 50% | 595 |
| 90% | 650 |
| E. P. | 680 |

The three catalysts used in the test hereinafter described may be classified as catalysts of high, moderate and low directive activity, respectively. The catalyst of high directive activity was a synthetic composition consisting of 85% silica and 15% alumina. A sulphuric acid treated bentonite generally marketed under the trade name "Super Filtrol" was used as the catalyst of moderate directive activity. Olmsted earth ground to pass 89% through 200 mesh was used as the catalyst of low directive activity.

The cracking apparatus was first calibrated for thermal cracking at a reactor coil outlet pressure of 30 pounds with reactor coil temperatures of 950 and 1050° F. and also at reactor coil outlet pressures of 75 pounds and 200 pounds with reactor coil outlet temperatures of 1050° F. and 1000° F. respectively. An attempt to calibrate for thermal cracking at a reactor coil outlet temperature of 1050° F. with an outlet pressure of 200 pounds resulted in plugging of the coil with coke in two hours so that no reliable data could be obtained. In all operations the oil was rapidly brought to the reactor temperature and then maintained at this temperature in the reactor coil for a predetermined period of time controlled by regulation of the throughput relative to the pressure employed.

In the thermal cracking operations at 30 pounds pressure the throughput was controlled to maintain an apparent time factor in the reactor coil of about 67 seconds. With a temperature of 950° F. and a pressure of 30 pounds the thermal cracking reaction converted 10.8% by volume of the charge into a stabilized 400° F. end point gasoline having an octane value of 67.1 as determined by the motor method. This operation produced 1600 cu. ft. of gas per barrel of gasoline. In a similar operation with a reactor temperature of 1050° F. the thermal cracking reaction converted 31.6% of the charge by volume into stabilized 400° F. end point gasoline having an octane value of 70.5 as determined by the motor method. This operation produced 2950 cu. ft. of gas per barrel of gasoline. In the thermal operation at 1000° F. and 200 pounds, the throughput was controlled to maintain an apparent time factor approximating 205 seconds. This produced 36.8% gasoline by volume and 2135 cu. ft. of gas per barrel of gasoline. The gasoline had an octane value of 71.2 as determined by the motor method. In the thermal operation at 1050° F. and 75 pounds, the throughput was controlled to maintain an apparent time factor approximating 85 seconds. This produced 33.8% gasoline by volume and 2830 cu. ft. of gas per barrel of gasoline. The gasoline had an octane value of 71.4 as determined by the motor method.

Three generally similar operations each conducted at a pressure of 30 pounds but with reactor temperatures of 950° F., 1000° F., and 1050° F., respectively, then were carried out with 1% of the above-mentioned synthetic silica-alumina catalyst, based on the oil by weight, present in the mixture entering the reactor coil. In each of these three operations the rate of feed was controlled to provide an apparent time factor, at the reactor coil temperature, of about 32 seconds. The yield of stabilized 400° F. end point gasoline given as a percentage of the charge by volume, the octane value of the gasoline as determined both by the motor method and the research method, and the gas produced per barrel of gasoline for each of these three tests are given in the following table:

| Reactor coil, temperature | Gasoline, vol. per cent on charge | Gas, cu. ft. per bbl. gasoline | Octane MM | Octane Res. M |
|---|---|---|---|---|
| 950° F | 13.9 | 576 | 76.5 | 89.7 |
| 1000° F | 20.9 | 1,234 | 75.7 | 87.9 |
| 1050° F | 30.3 | 1,780 | 76.1 | 90.2 |

A number of additional tests then were made using the Olmsted earth previously described as the catalyst of low directive activity in concentrations of 1%, 10%, 30% and 50%, by weight on the oil. One test with the catalyst in 1% concentration was carried out with a reactor coil temperature of 950° F. and a reactor coil outlet pressure of 30 pounds per square inch. The throughput was controlled to provide an apparent time factor at the reactor coil temperature of approximately 70 seconds. Two tests with the earth in 10% concentration were carried out with reactor coil temperatures of 1000° F. and 1050° F., respectively, and with reactor coil outlet pressures of 200 pounds per square inch. The throughputs were controlled to give apparent time factors approximating 205 seconds in both tests. Two tests with the earth in 30% concentration then were carried out with reactor coil outlet temperatures of 1050° F. and with reactor coil outlet pressures of 75 and 200 pounds, respectively. The throughputs used were such as to give apparent time factors approximating 78 and 210 seconds, respectively. Four additional tests were carried out with the earth in 50% concentrations. In the first, a reactor coil temperature of 1000° F. and a pressure of 75 pounds were employed while the throughput was controlled to give an apparent time factor approximating 78 seconds. In the second, a reactor coil temperature of 1000° F. and a pressure of 200 pounds were employed while the throughput was controlled to give an apparent time factor approximating 190 seconds. In the third, a reactor coil temperature of 1050° F. and a pressure of 75 pounds were employed while the throughput was controlled to give an apparent time factor approximating 78 seconds. In the fourth, a reactor coil temperature of 1050° F. and a pressure of 200 pounds were employed while the throughput was controlled to give an apparent time factor approximating 180 seconds. The yield of stabilized 400° F. end point gasoline given as a percentage of the charge by volume, the octane value of the gasoline as determined both by the motor method and the research method, and the gas produced per barrel of gasoline, for each of several tests last described are given in the following table:

| Per cent cat. | Reactor coil, temp. °F. | Reactor coil, pres. | Gasoline, vol. per cent on charge | Gas, cu. ft. per bbl. gasoline | Octane MM | Octane Res. M |
|---|---|---|---|---|---|---|
| 1% | 950 | 30 | 13.8 | 1,000 | 66.9 | 78.3 |
| 10% | 1,000 | 200 | 35.8 | 1,093 | 74.1 | 85.8 |
| 10% | 1,050 | 200 | 30.7 | 3,585 | 77.0 | 91.0 |
| 30% | 1,050 | 75 | 39.1 | 1,510 | 75.6 | 90.1 |
| 30% | 1,050 | 200 | 38.9 | 3,050 | 78.4 | 91.5 |
| 50% | 1,000 | 75 | 28.9 | 1,498 | 76.0 | 88.3 |
| 50% | 1,000 | 200 | 36.9 | 1,595 | 77.3 | 86.5 |
| 50% | 1,050 | 75 | 29.5 | 2,690 | 76.7 | 90.3 |
| 50% | 1,050 | 200 | 27.9 | 3,950 | 77.4 | 90.7 |

As the results of these tests show, the presence of a dispersed catalyst of high directive activity and in a concentration of only 1% caused a marked increase in the octane value of the gasoline over the entire range of temperatures from 950° to 1050° F., as compared to the octane value produced by thermal cracking even at a temperature of 1050° F. At the lower end of the temperature range it also effected a substantial increase in the gasoline yield as compared to the thermal cracking operation at the corresponding temperature. Moreover, it maintained the gas production at a reduced value throughout the temperature range.

On the other hand the catalyst of low directive activity in 1% concentration caused no significant increase in the octane value of the gasoline even at the lower end of the temperature range, although it did effect a slight increase in the gasoline yield and an appreciable reduction in gas formation as compared to the thermal cracking operation. However, in high concentration and with increased temperatures and pressures, the catalyst of low directive activity produced gasoline having an octane value markedly superior to that produced by thermal cracking and comparable with that produced by the catalyst of high directive activity. Moreover, even at temperatures of 1050° F. and with a prolonged time factor, the earth in high concentration maintains the octane value at a high level although with a prolonged time factor at this temperature the earth was not effective to prevent a major increase in gas formation and an accompanying decrease in gasoline production. However, with appropriate limitations of either the time factor or the temperature, the earth in high concentration was effective in increasing the gasoline production and decreasing the gas production while at the same time maintaining the antiknock rating of the produced gasoline at a high value.

Five additional tests then were carried out using a catalyst of moderate directive activity in concentrations of 1%, 10%, 30%, 30% and 50%, respectively, by weight on the oil. The catalyst used in this group of tests was the product generally marketed under the trade name "Super Filtrol." The test with the catalyst in 1% concentration was carried out with a reactor coil temperature of 950° F. and a reactor coil outlet pressure of 30 pounds per square inch. The throughput was controlled to provide an apparent time factor at the reactor coil temperature of approximately 45 seconds. The test with the catalyst in 10% concentration was carried out with a reactor coil temperature of 1050° F. and a pressure of 75 pounds while the throughput was controlled to provide an apparent time factor of approximately 122 seconds. One of the tests with the catalyst in 30% concentration was carried out with a reactor coil temperature of 1050° F. and a reactor coil outlet pressure of 30 pounds per square inch. The throughput was controlled to provide an apparent time factor at the reactor coil temperature of approximately 67 seconds. The other test with the catalyst in 30% concentration was carried out with a reactor temperature of 1000° F., a reactor coil outlet pressure of 30 pounds per square inch, and a throughput controlled to provide an apparent time factor of approximately 40 seconds at the reactor coil temperature. The test with the catalyst present in 50% concentration was carried out with a reactor temperature of 1050° F., a reactor outlet pressure of 75 pounds per square inch and a throughput controlled to provide an apparent time factor at the reactor temperature of approximately 90 seconds. The yield of stabilized 400° F. end point gasoline given as a percentage of the charge by volume, the octane value of the gasoline as determined both by the motor method and the research method, and the gas produced per barrel of gasoline, for each of these tests, are given in the following table:

| Per cent cat. | Reactor coil, temp. | Reactor coil, pres. | Gasoline, vol. per cent on charge | Gas, cu. ft. per bbl. gasoline | Octane | |
|---|---|---|---|---|---|---|
| | | | | | MM | Res. M |
| | °F. | | | | | |
| 1% | 950 | 30 | 14.9 | 1,160 | 71.3 | 83.3 |
| 10% | 1,050 | 75 | 35.4 | 1,433 | 78.0 | 91.4 |
| 30% | 1,000 | 30 | 36.1 | 625 | 77.2 | 88.3 |
| 30% | 1,050 | 30 | 43.1 | 1,375 | 79.3 | 90.8 |
| 50% | 1,050 | 75 | 51.5 | 854 | 79.9 | 90.2 |

These tests illustrate that a catalyst of moderate directive activity in low concentration does not affect the major increase in octane value that is characteristic of the action of catalysts of high directive activity under similar conditions. However, they clearly show that catalysts of moderate directive activity in concentrations of 10%–50% and with temperatures of 1000°–1050° F. will easily produce gasoline having an octane value comparing favorably with that produced with the more costly catalysts of high directive activity, and at a rate sufficiently rapid to permit a gasoline production upwards of 35% per passage through the cracking zone with a time factor short enough to permit utilization of the cracking coils typical of existing thermal cracking apparatus.

Two additional tests, using the same charging oil and catalyst as those employed in the group of tests last described, then were made with the catalyst present in 50% concentration. A reactor coil outlet pressure of 75 pounds per square inch was maintained in both of these tests. However, in the first of these additional tests the reactor coil temperature was held at 1050° F. and the throughput was controlled to provide an apparent time factor approximating 140 seconds at the reactor coil temperature. In the second, the reactor coil temperature was increased to 1075° F. and the throughput was controlled to provide an apparent time factor of approximately 84 seconds at the reactor coil temperature. The data corresponding to that given in the last table is given for these two additional tests in the following table:

| Per cent cat. | Reactor coil, temp. | Reactor coil, pres. | Gasoline, vol. per cent on charge | Gas, cu. ft. per bbl. gasoline | Octane | |
|---|---|---|---|---|---|---|
| | | | | | MM | Res. M |
| | °F. | | | | | |
| 50% | 1,050 | 75 | 48.4 | 895 | 78.9 | 91.0 |
| 50% | 1,075 | 75 | 52.8 | 1,270 | 81.1 | 92.2 |

The first test in the group last described shows that the substantial prolongation of the apparent time factor employed in this test caused a significant decrease in the gasoline yield and in the octane value of the gasoline as compared to the values obtained in the previously described test under corresponding conditions of temperature, pressure, and catalyst concentration, but with an apparent time factor of only 90 seconds. This substantial increase in time factor also was accompanied by a moderate increase in the production of gas.

The final test in the group last described shows that even when the apparent time factor is limited to a value less than 90 seconds, any substantial increase in the reactor coil temperature above 1050° F. is accompanied by a major increase in the amount of gas produced notwithstanding the presence of a catalyst of moderate activity in 50% concentration, but that a slight further increase in the anti-knock value of the gasoline may be obtained in this manner if desired.

The term apparent time factor as used herein is the calculated time required for the oil in vapor form, and at the temperature and pressure employed in each instance, to pass through the reactor coil of known volume, assuming that perfect gas laws apply and without taking into consideration the effect of cracking. The actual time factor is of course less than this calculated apparent time factor due to the effect of cracking.

While the exemplary operations herein described have been confined to tests which do not involve either recirculation of liquid constituents suitable for use as recycle stock or recirculation of normally gaseous products of the cracking reaction in order to eliminate the masking effects of as many variables as possible and thus to provide a more reliable basis for comparison, it will be appreciated that the ultimate yield of the desired gasoline product may be further increased and the generation of normally gaseous products substantially reduced by such recirculations.

I claim:

1. In the production of high anti-knock gasoline by cracking hydrocarbon oils in the presence of a finely-divided adsorptive catalyst of not more than moderate directive activity wherein a mixture of vapors of the oil to be cracked and a finely-divided adsorptive catalyst is passed through an elongated cracking zone of restricted cross section at a velocity adequate to maintain a substantially uniform dispersion of the catalyst in the oil vapors, the improvement which comprises subjecting said mixture in said cracking zone to a temperature upwards of 1000° F. and not substantially exceeding 1075° F. for a period of time upwards of about 23 seconds and sufficient to convert upwards of about 28% but not more than about 52% of said vapors into hydrocarbons suitable as components of the desired anti-knock gasoline during a single passage through said cracking zone, maintaining a pressure upwards of about 30 pounds per square inch but not substantially exceeding 400 pounds per square inch on the mixture in said cracking zone and maintaining the ratio of catalyst to oil vapors in said cracking zone at a value between about 1:10 and 5:10 parts by weight.

2. In the production of high anti-knock gasoline by cracking hydrocarbon oils in the presence of a finely-divided adsorptive catalyst of not more than moderate directive activity wherein a mixture of vapors of the oil to be cracked and a finely-divided adsorptive catalyst is passed through an elongated cracking zone of restricted cross section at a velocity adequate to maintain a substantially uniform dispersion of the catalyst in the oil vapors, the improvement which comprises subjecting said mixture in said cracking zone to a temperature approximating 1000–1050° F. for a period of time upwards of 23 seconds and sufficient to convert upwards of about 28% but not more than 52% of said vapors into hydrocarbons suitable as components of the desired gasoline during a single passage through said cracking zone, maintaining a pressure upwards of about 30 pounds and less than about 200 pounds per square inch on the mixture in said cracking zone, and maintaining the ratio of catalyst to oil vapors in said cracking zone at a value between about 1:10 and 5:10 parts by weight.

3. In the production of high anti-knock gasoline by cracking hydrocarbon oils in the presence of a finely-divided adsorptive catalyst of not more than moderate directive activity wherein a mixture of vapors of the oil to be cracked and a finely-divided adsorptive catalyst is passed through an elongated cracking zone of restricted cross section at a velocity adequate to maintain a substantially uniform dispersion of the catalyst in the oil vapors, the improvement which comprises subjecting said mixture in said cracking zone to a temperature approximating 1050° F. for a period of time upwards of 23 seconds and sufficient to convert upwards of about 28% of said oil vapors into hydrocarbons suitable as components of the desired anti-knock gasoline during a single passage through said cracking zone but not exceeding about 125 seconds, maintaining a superatmospheric pressure approximating 75–200 pounds per square inch on the mixture in said cracking zone, and maintaining the ratio of catalyst to oil vapors in said cracking zone at a value approximating 3:10–5:10 parts by weight.

JOHN W. TETER.